United States Patent [19]
Siwiak et al.

[11] Patent Number: 5,446,922
[45] Date of Patent: Aug. 29, 1995

[54] METHOD AND APPARATUS FOR SWITCHED DIVERSITY RECEPTION OF A RADIO SIGNAL

[75] Inventors: Kazimierz Siwiak, Coral Springs; Robert J. Schwendeman, Pompano Beach; Robert L. Breeden, Boca Raton, all of Fla.

[73] Assignee: Motorola, Inc., Schaumburg, Ill.

[21] Appl. No.: 993,761

[22] Filed: Dec. 21, 1992

[51] Int. Cl.⁶ .............................................. H04B 7/08
[52] U.S. Cl. ................................ 455/277.2; 455/65; 455/135; 455/278.1
[58] Field of Search ................. 455/135, 38.1, 277.1, 455/277.2, 278.1, 134, 133, 63, 65, 226.2, 226.3; 340/825.44

[56] References Cited

U.S. PATENT DOCUMENTS

| | | | |
|---|---|---|---|
| 4,499,606 | 2/1985 | Rambo | 455/277.2 |
| 4,513,412 | 4/1985 | Cox | 455/134 X |
| 4,584,709 | 4/1986 | Kneisel et al. | 455/78 |
| 4,742,568 | 5/1988 | Furuya | 455/277 |
| 4,851,820 | 7/1989 | Fernandez | 340/825.44 |
| 4,853,972 | 8/1989 | Ueda et al. | 455/83 |
| 4,914,714 | 4/1990 | Tamura | 455/78 |
| 5,023,621 | 6/1991 | Ushiyama et al. | 343/702 |
| 5,144,296 | 9/1992 | DeLuca et al. | 340/825.44 |

OTHER PUBLICATIONS

Pin Diode Designers' Handbook and Catalog, pp. 89–99, 1982, by Unitrode Corporation of Watertown, Mass.

Primary Examiner—Reinhard J. Eisenzopf
Assistant Examiner—Philip J. Sobutka
Attorney, Agent, or Firm—R. Louis Breeden

[57] ABSTRACT

A method and apparatus in a data communication receiver (100) for diversity reception of a radio signal including a predictably repetitive, predetermined data bit pattern (304) comprises a processor (114) controlling (600) an antenna switch (106) to select between a first antenna feed (102) and a second antenna feed (104) as a momentary source of the radio signal during transmissions of the predetermined data bit pattern (304). The radio signal received from the momentary source is monitored by a data receiver (110) during the transmission of the predetermined bit pattern (304) to derive the data therefrom, and at least one bit error count is determined (604, 610) by the processor (114). After completion of the predetermined bit pattern (304), an antenna feed (102, 104) for the radio signal is selected (616, 620) in response to the at least one bit error count.

8 Claims, 11 Drawing Sheets

1400

700

*800*

*1000*

*1200*

1100

1500

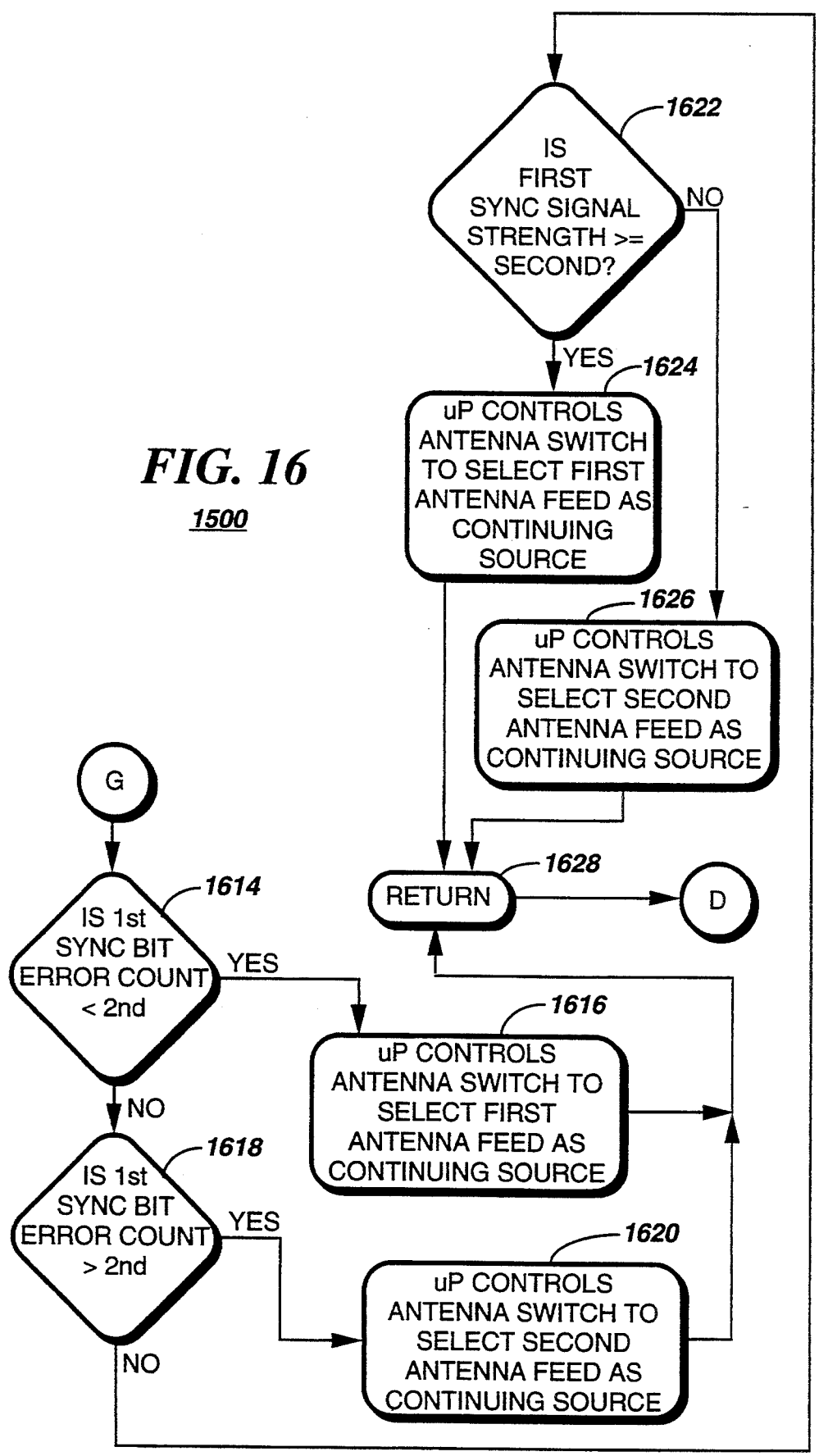

METHOD AND APPARATUS FOR SWITCHED DIVERSITY RECEPTION OF A RADIO SIGNAL

FIELD OF THE INVENTION

This invention relates in general to radio communication devices, and more specifically to a radio communication device comprising a method and apparatus for switched diversity reception.

BACKGROUND OF THE INVENTION

Diversity reception radio receivers are well known in the art. Such receivers have been used to substantially improve radio reception in a changing multipath environment. Diversity receivers are particularly desirable in mobile and portable applications, in which a receiver may be moved into an isolated weak signal area caused by self-cancellation of multipath signals.

One conventional approach to a diversity receiver has comprised a dual antenna space-diversity system, the dual antennas coupled to a switch for selectively coupling one of the dual antennas to a single receiver. During operation the receiver is switched to an alternate antenna in response to a signal received from a currently selected antenna deteriorating below a predetermined switching threshold. This approach has a drawback in that the approach does not always select the antenna having the stronger signal. For example, a currently selected antenna having a signal marginally above the predetermined switching threshold would remain selected, even though a signal from a non-selected antenna is much stronger.

Another conventional approach to the diversity receiver has comprised a dual space-diversity antenna system separately coupled to dual receiver elements for amplifying and demodulating a radio signal received by the dual antennas. Such receivers have typically utilized an electronic switch to select the "best" output signal from one of the dual receiver elements based upon a measurable selection criterion, such as signal-to-noise ratio. Unfortunately, while the dual receiver approach to diversity reception has provided performance superior to the single receiver approach, it has typically been an expensive and power-hungry approach. This is because the dual receiver approach has required significantly more receiver circuitry than the single receiver approach.

Thus, what is needed is a way of building a diversity receiver that provides the cost and power advantages of a single receiver, switched antenna approach, but that can continuously select the antenna feed having the stronger signal.

SUMMARY OF THE INVENTION

One aspect of the present invention is a method of diversity reception of a radio signal in a data communication receiver comprising first and second antenna feeds having substantially de-correlated sensitivities to the radio signal, the radio signal comprising data including at least one information batch having a predetermined batch duration and prefixed by a predetermined bit pattern. The method comprises the steps of (a) selecting between the first antenna feed and the second antenna feed as a transitory source of the radio signal during transmission of the predetermined bit pattern, and (b) monitoring the radio signal received from the transitory source selected in step (a) during the transmission of the predetermined bit pattern to derive the data therefrom. The method further comprises the steps of (c) determining at least one bit error count for the data derived in step (b), and (d) selecting between the first and second antenna feeds to be a continuing source of the radio signal at a completion of the predetermined bit pattern in response to the at least one bit error count determined in step (c). In addition, the method includes the steps of (e) measuring a first signal strength of the radio signal from the first antenna feed during transmission of a first portion of the predetermined bit pattern, and (f) measuring a second signal strength of the radio signal from the second antenna feed during transmission of a second portion of the predetermined bit pattern. The method also includes the step of (g) determining that a signal strength conflict exists in response to the first signal strength being greater than the second signal strength, the second antenna feed having been selected in step (d) as the continuing source, and also in response to the second signal strength being greater than the first signal strength, the first antenna feed having been selected in step (d) as the continuing source. The method further comprises the step of (h) determining that no signal strength conflict exists in response to the first signal strength being greater than the second signal strength, the first antenna feed having been selected in step (d) as the continuing source, and also in response to the second signal strength being greater than the first signal strength, the second antenna feed having been selected in step (d) as the continuing source. In addition, the method comprises the steps of (i) maintaining the selection of the continuing source selected in step (d) throughout the predetermined batch duration, it having been determined in step (g) that a signal strength conflict exists; and (j) periodically re-selecting the continuing source throughout the predetermined batch duration in response to signal strength measurements determined for the first and second antenna feeds, it having been determined in step (h) that no signal strength conflict exists.

Another aspect of the present invention is a method of diversity reception in a data communication receiver comprising first and second antenna feeds having substantially de-correlated sensitivities to a radio signal, the radio signal comprising data including at least one information batch having a predetermined batch duration and prefixed by a predetermined bit pattern. The method comprises the steps of (a) selecting the first antenna feed as a transitory source of the radio signal during transmission of a first portion of the predetermined bit pattern, and (b) selecting the second antenna feed as the transitory source of the radio signal during transmission of a second portion of the predetermined bit pattern. The method further comprises the steps of (c) monitoring the radio signal received from the transitory source selected in steps (a) and (b) during the transmission of the predetermined bit pattern to derive the data therefrom, and (d) determining a first bit error count for the data derived in step (c) during the transmission of the first portion of the predetermined bit pattern from the first antenna feed selected in step (a). The method also includes the steps of (e) determining a second bit error count for the data derived in step (c) during the transmission of the second portion of the predetermined bit pattern from the second antenna feed selected in step (b), and (f) selecting a continuing source of the radio signal at a completion of the predetermined bit pattern to be the first antenna feed in response to the first bit error count being less than the second bit error count. In addition, the method includes the steps of (g) selecting the continuing source to be the second antenna feed, the first bit error count being greater than the second bit error count; and (h) measuring signal strength of the radio signal throughout the predetermined batch duration. The method further comprises the steps of (i) selecting the second antenna feed as the continuing source in response to the signal strength measured in step (h) falling below a predetermined threshold when the first antenna feed is currently selected as the continuing source, and (j) selecting the first antenna feed as the continuing source in response to the signal strength measured in step (h) falling below the predetermined threshold when the second antenna feed is currently selected as the continuing source.

Another aspect of the present invention is a data communication receiver for providing diversity reception of a radio signal comprising data including at least one information batch having a predetermined batch duration and prefixed by a predetermined bit pattern. The data communication receiver comprises first and second antenna feeds having substantially de-correlated sensitivity to a radio signal, and an antenna switch coupled to the first and second antenna feeds for selecting between the first antenna feed and the second antenna feed as a source of the radio signal. The data communication receiver further comprises a receiver coupled to the antenna switch for receiving the radio signal from the antenna switch and for demodulating the radio signal to derive the data, and a processor coupled to the receiver and to the antenna switch for controlling the antenna switch in response to quality measurements made on the received radio signal. The data communication receiver also includes an antenna switch control element coupled to the antenna switch for controlling the antenna switch to select between the first and the second antenna feed as a transitory source of the radio signal during transmission of the predetermined bit pattern, and a sync bit error count element coupled to the antenna switch control element for determining at least one bit error count in the data received during the transmission of the predetermined bit pattern. In addition, the data communication receiver includes a sync end continuing source select element coupled to the sync bit error count element for controlling the antenna switch to select the first or the second antenna feed as a continuing source of the radio signal at a completion of the predetermined bit pattern in response to the at least one bit error count. The data communication receiver further comprises a 1-2 portion transitory source select element coupled to the antenna switch control element for selecting the first antenna feed as the transitory source during transmission of a first portion of the predetermined bit pattern to determine a first bit error count, and for selecting the second antenna feed as the transitory source during transmission of a second portion of the predetermined bit pattern to determine a second bit error count. The data communication receiver also includes a sync bit error count continuing source select element coupled to the 1-2 portion transitory source select element for selecting the continuing source to be the first antenna feed in response to the first bit error count being less than the second bit error count, and for selecting the continuing source to be the second antenna feed in response to the first bit error count being greater than the second bit error count. In addition, the data communication receiver includes a received signal strength indicator element coupled to the receiver and to the processor for measuring the signal strength of the radio signal in response to the first and second bit error counts being equal to one another; and an equal bit error count signal strength select element coupled to the received signal strength indicator element for selecting the continuing source to be the first antenna feed in response to the first signal strength being measured greater than or equal to the second signal strength, and for selecting the continuing source to be the second antenna feed in response to the first signal strength being measured less than the second signal strength.

BRIEF DESCRIPTION OF THE DRAWINGS

FIG. 16 is a continuation of the flow chart of the sync word evaluation subroutine of FIG. 15.

DESCRIPTION OF THE PREFERRED EMBODIMENT

Figure 1:
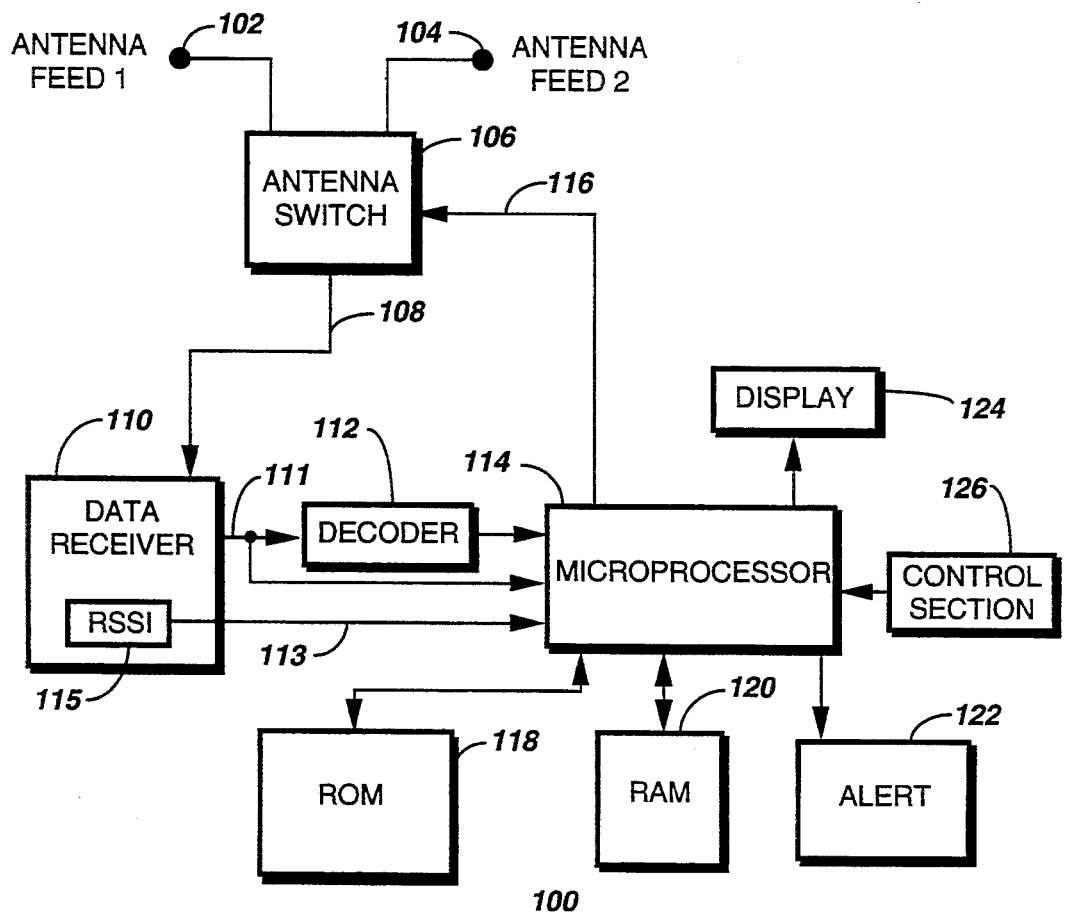
FIG. 1 is an electrical block diagram of a data communication receiver having switched diversity reception in accordance with the preferred embodiment of the present invention.

Referring to FIG. 1, an electrical block diagram of a data communication receiver 100 having switched diversity reception in accordance with the preferred embodiment of the present invention comprises first and second antenna feeds 102, 104 having substantially decorrelated sensitivities to a radio signal. The first and second antenna feeds 102, 104 are coupled to an antenna switch 106 for selecting between the first and second antenna feeds 102, 104 as a source of input for a common antenna feed 108 coupled to a data receiver 110. The data receiver 110 comprises a received signal strength indicator (RSSI) element 115 coupled to a microprocessor 114 by an RSSI line 113 for indicating a first received signal strength.

A data output line 111 of the data receiver 110 is coupled to a decoder 112 for decoding address information received from the data receiver, and is coupled to the microprocessor 114 for processing received messages. The microprocessor 114 is coupled to the decoder 112 for receiving notification when an address decoded by the decoder 112 matches a pre-programmed address of the data communication receiver 100. The microprocessor 114 is coupled to a read-only memory (ROM) 118 for storing executable operating system firmware and to a random access memory (RAM) 120 for temporary storage of operating variables and other calculated values. The microprocessor 114 is also coupled to an alert generator 122 for generating an audible or tactile alert in response to a received message. The microprocessor 114 is also coupled to a display 124, e.g., a liquid crystal display, for displaying a received message and coupled to a control section 126 comprising well-known control buttons and knobs for user control of the data communication receiver 100. In addition, the microprocessor 114 is coupled to the antenna switch 106 by a switch control line 116 for controlling the antenna switch 106 to select between the first and second antenna feeds 102, 104 in accordance with the preferred embodiment of the present invention.

The microprocessor 114 is preferably an MC68HCL05C8 microcontroller available from Motorola, Inc. of Schaumburg, Ill. It will be appreciated that the function of the decoder 112 may also be handled by the microprocessor 114 in a manner well known in the art. It also will be appreciated that the RAM 120 and the ROM 118 may be manufactured as a contiguous part of the microprocessor 114. It will be further appreciated that other similar devices may be used instead without departing from the intent of the present invention. The antenna switch 106 is well known in the art. For further information on antenna switches one is referred to *Pin Diode Designers' Handbook and Catalog*, published in 1982 by Unitrode Corporation of Watertown, Mass., pages 89–99.

Figure 2:
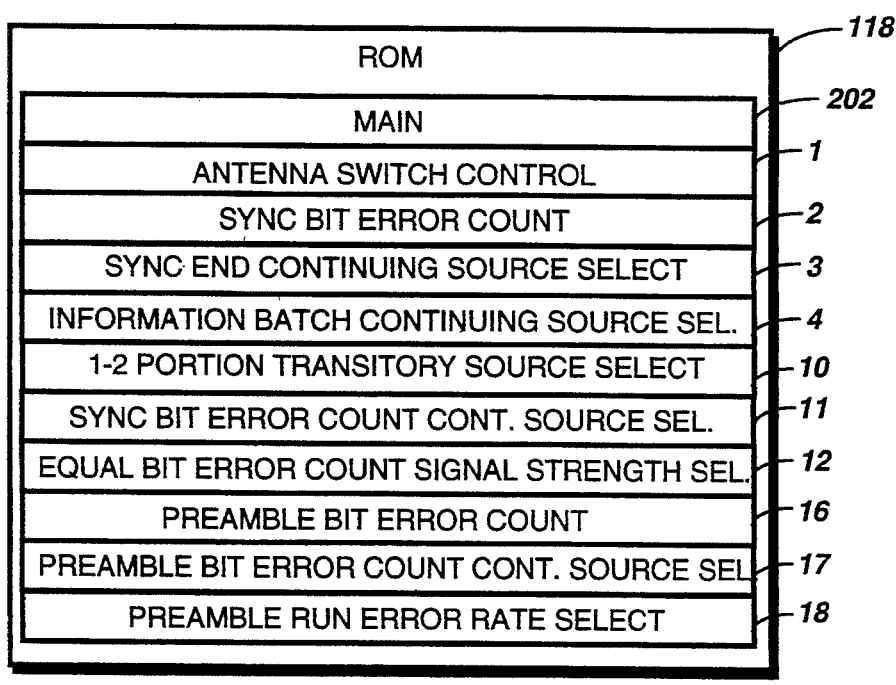
FIG. 2 is a firmware diagram for a read-only memory depicting firmware elements pre-programmed therein for controlling the data communication receiver in accordance with the preferred embodiment of the present invention.

Referring to FIG. 2, a firmware diagram 200 for the ROM 118 depicting firmware elements pre-programmed therein for controlling the data communication receiver 100 in accordance with the preferred embodiment of the present invention comprises a Main Firmware element 202 for controlling diversity reception. The operation of the Main Firmware element 202 and other firmware elements associated with operation of diversity reception in the data communication receiver 100 is described in detail below. Remaining firmware elements of the firmware diagram 200 are described briefly in the following paragraph.

The firmware diagram 200 further comprises an Antenna Switch Control element 1 for controlling the antenna switch 106, and a Sync Bit Error Count element 2 for counting bit errors during transmission of a sync word to be described below. The firmware diagram 200 also comprises a Sync End Continuing Source Select element 3 for selecting between the first and second antenna feeds 102, 104 to be a continuing source of the radio signal at completion of the sync word 304, and an Information Batch Continuing Source Select element 4 for selecting the continuing source during transmission of an information batch to be described below. Also included in the firmware diagram 200 are a 1-2 Portion Transitory Source Select element 10 for selecting a transitory source of the radio signal for reception of first and second portions of the sync word 304, and a Sync Bit Error Continuing Source Select element 11 for selecting the continuing source in response to bit error counts determined during reception of first and second portions of the sync word 304. In addition, an Equal Bit Error Count Signal Strength Select element 12 is included for selecting the continuing source in response to received signal strength measurements, and a Preamble Bit Error Count element 16 for counting bit errors during transmission first and second portions of a preamble. Furthermore, a Preamble Bit Error Count Continuing Source Select element 17 selects the continuing source for the preamble based upon bit error count, and a Preamble Running Error Rate Select element 18 calculates a running bit error rate and selects the continuing source based upon the running bit error rate. Operation of the firmware elements 1, 2, 3, 4, 10, 11, 12, 16, 17, and 18 is described fully in flow charts discussed below.

Figure 3:
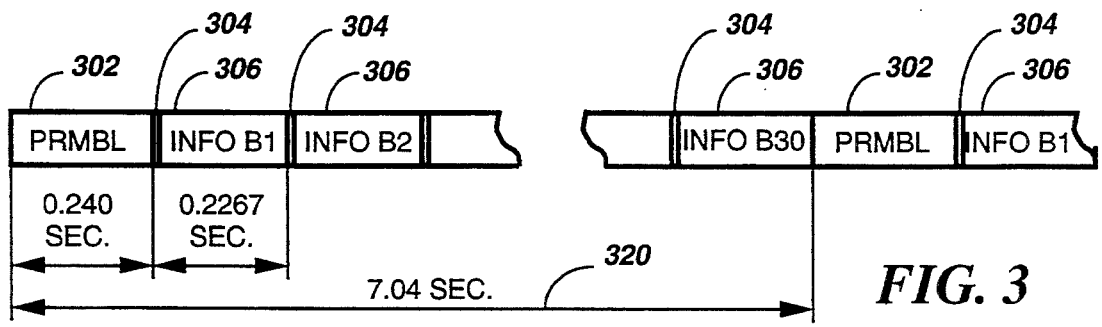
FIG. 3 is a timing diagram of a data communication encoding format in accordance with the preferred embodiment of the present invention.

Referring to FIG. 3, a timing diagram of a data communication encoding format in accordance with the preferred embodiment of the present invention is depicted. The encoding format depicted is the well-known Post Office Code Standardization Advisory Group (POCSAG) encoding format. The time values shown are representative of the POCSAG encoding format when operating at 2400 bits per second (bps).

The 2400 bps POCSAG format begins with a preamble 302 comprising an alternating one-zero bit pattern of 576 bits, lasting 0.24 seconds. The preamble 302 is followed by a 32-bit sync word 304 having a predetermined unique bit pattern not allowed elsewhere in the POCSAG format. The sync word 304 is followed by a first information batch 306 of 512 bits. The sync word 304 and first information batch together require 0.2267 seconds to transmit. The first information batch 306 is followed by the next sync word 304, and thence by a second information batch 306. The POCSAG format continues to repeat the sync word 304 followed by an information batch until a thirtieth information batch 306 completes one POCSAG sequence 320 lasting 7.04 seconds. This is followed by a new sequence comprising the preamble 302, the sync word 304, an information batch 306, and so on, for as long as there is information to be sent.

A key characteristic of the POCSAG format that is utilized by the preferred embodiment of the data communication receiver 100 in accordance with the present invention is the predictably repetitive characteristic of the sync word 304. Because the sync word 304 has a known, predetermined bit pattern, the data communication receiver 100 can compare the known, predetermined bit pattern with data bits received during transmission of the sync word 304 and can then make an immediate assessment of errors in the data bits received during the sync word 304. In addition, the alternating one-zero bit pattern of the preamble 302 can be examined vis-a-vis received preamble data bits to make a similar immediate assessment of errors in the data bits received during the preamble 302. While the POCSAG encoding format is an example of a format that performs well in accordance with the present invention, it will be appreciated that other encoding formats having repeating predetermined bit patterns may be used as well without departing from the intent of the present invention.

Figure 4:
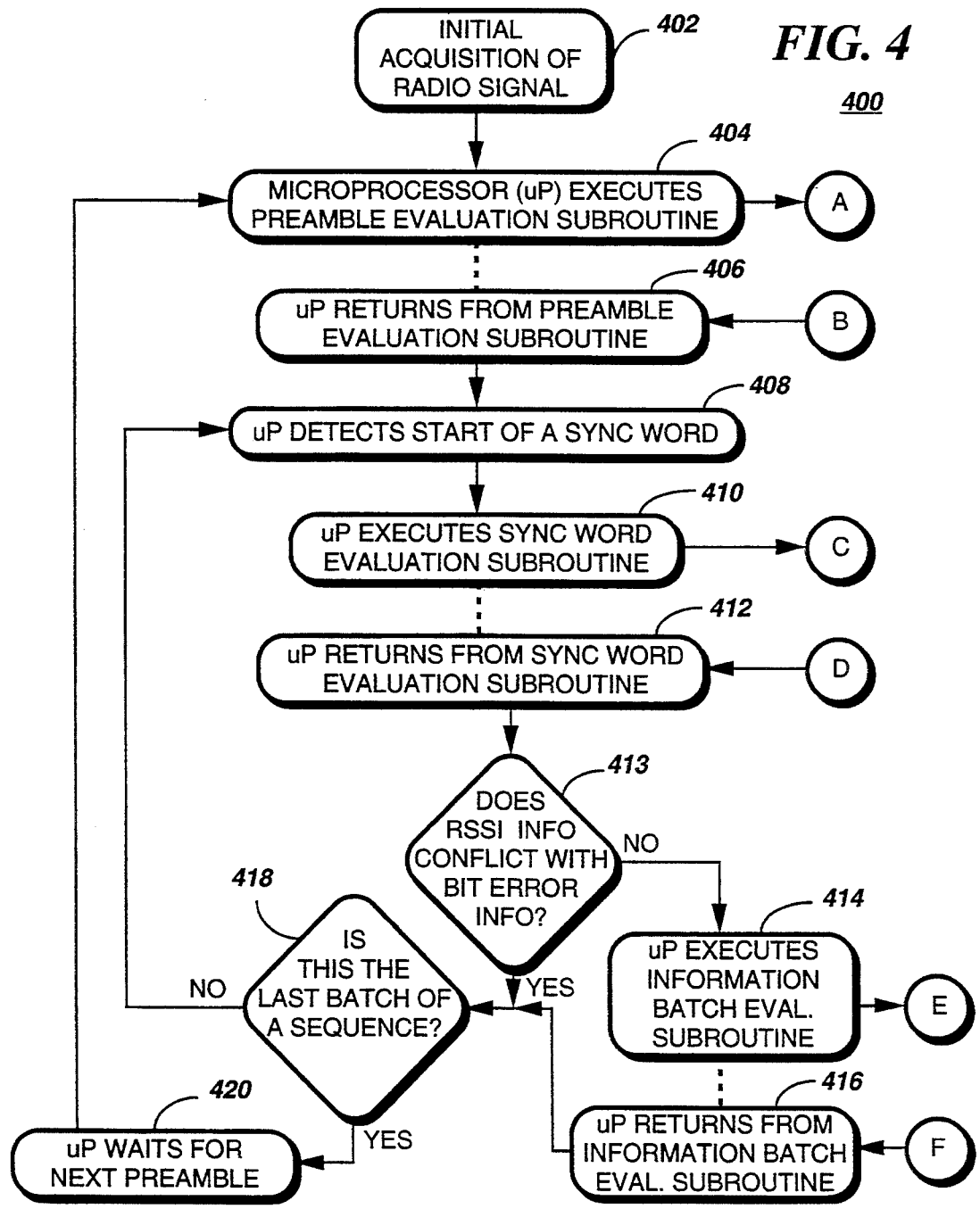
FIG. 4 is a flow chart of a main program corresponding to a main firmware element comprising a method of diversity reception in the data communication receiver in accordance with the preferred embodiment of the present invention.

Referring to FIG. 4, a flow chart of a main program 400 corresponding to the main firmware element 202 comprising a method of diversity reception in the data communication receiver 100 in accordance with the preferred embodiment of the present invention begins with initial acquisition 402 of the radio signal. In response, the microprocessor 114 executes 404 a preamble evaluation subroutine to be described below to determine an antenna feed to use during transmission of the preamble 302. After the microprocessor 114 returns 406 from the preamble evaluation subroutine, the microprocessor 114 detects 408 the start of the sync word 304 and then executes 410 a sync word evaluation subroutine to be described below to determine an antenna feed to use during and after reception of the sync word 304.

After the microprocessor 114 returns 412 from the sync word evaluation subroutine, the microprocessor 114 checks 413 whether RSSI information derived during the sync word evaluation subroutine conflicts with bit error count information derived therewith. More specifically, the microprocessor 114 determines whether the antenna feed 102, 104 that produced the lower, i.e., better, bit error count is the same antenna feed 102, 104 that produced the lower, i.e., worse, RSSI value. If there is not a conflict, then the microprocessor 114 executes 414 an information batch evaluation subroutine to be described below, which relies upon periodic RSSI measurements to determine an antenna feed 102, 104 to use throughout the information batch 306. When the microprocessor 114 returns 416 from the information batch evaluation subroutine 700, flow moves to step 418. On the other hand, if in step 413 the microprocessor 114 determines that there is a conflict between the RSSI information and the bit error count information, then the microprocessor 114 skips the information batch evaluation subroutine 700 and moves directly to step 418.

The check made in step 413 advantageously improves antenna feed selection in a situation in which there is an interfering signal being received with substantial signal strength on one of the antenna feeds 102, 104 but not the other. In such a situation the interfering signal itself may produce a stronger RSSI value at the antenna feed 102, 104 at which the interfering signal may also be producing a greater number of bit errors. The better choice of antenna feed in this situation clearly is the antenna feed 102, 104 having the lower bit error count, not the antenna feed 102, 104 having the higher RSSI value.

In step 418 the microprocessor 114 determines whether the information batch 306 just transmitted is the last information batch 306 of the POCSAG sequence 320. If not, the microprocessor 114 returns to step 408 to process another sync word 304 and information batch 306. If, on the other hand, in step 418 the microprocessor 114 determines that the information batch 306 just evaluated is the last information batch 306 of the POCSAG sequence 320, then the microprocessor 114 waits 420 for the next preamble 302 and then returns to step 404 to process a next POCSAG sequence 320.

Figure 5:
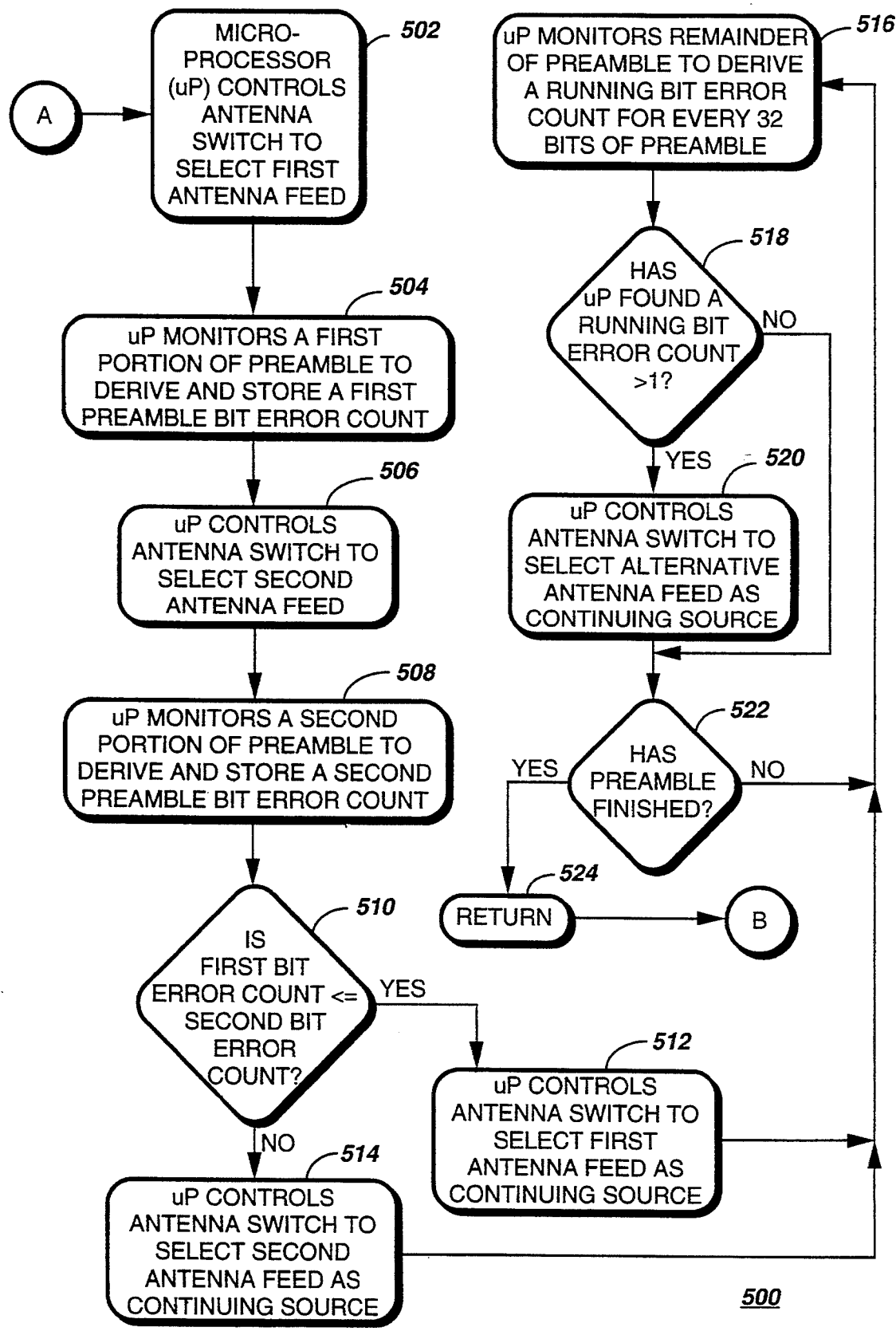
FIG. 5 is a flow chart of a preamble evaluation subroutine comprising the method of diversity reception in the data communication receiver in accordance with the preferred embodiment of the present invention.

Referring to FIG. 5, a flow chart of the preamble evaluation subroutine 500 comprising the method of diversity reception in the data communication receiver 100 in accordance with the preferred embodiment of the present invention begins with the microprocessor 114 controlling 502 the antenna switch 106 to select the first antenna feed 102 as a transitory source of a radio signal for the data receiver 110. Next, the microprocessor 114 monitors 504 a first portion, e.g., 32 bits, of the preamble 302 to derive and store a first preamble bit error count. Then the microprocessor 114 controls 506 the antenna switch 106 to select the second antenna feed 104 as the transitory source for the data receiver 110. Next, the microprocessor 114 monitors 508 a second portion, e.g., another 32 bits, of the preamble 302 to derive and store a second bit error count.

In step 510 the microprocessor 114 determines whether the first preamble bit error count is less than or equal to the second bit error count. If so, the microprocessor 114 controls 512 the antenna switch 106 to select the first antenna feed 102 as the continuing source of the radio signal. If not, the microprocessor 114 controls 514 the antenna switch 106 to select the second antenna feed 104 as the continuing source of the radio signal. In either event, the microprocessor 114 then continues to monitor 516 the preamble 302 to derive a running bit error count, e.g., a count of bit errors for each 32 bits of the preamble 302. Concurrently with step 516, the microprocessor 114 checks 518 each running bit error count to see if more than one bit error has occurred. If not, the microprocessor 114 simply proceeds to step 522. If more than one bit error has occurred, the microprocessor 114 controls 520 the antenna switch 106 to select an alternative antenna feed as the continuing source of the radio signal, i.e., the microprocessor 114 selects the first antenna feed 102 if the second antenna feed 104 is currently selected, and vice versa. Then the microprocessor 114 proceeds to step 522. At step 522 the microprocessor 114 checks whether the preamble 302 has finished. If not, flow returns to step 516 to continue monitoring the preamble 302. If the preamble 302 has finished, flow returns 524 to the main program 400 at step 406 (FIG. 4). The firmware elements controlling the preamble evaluation subroutine 500 in accordance with the preferred embodiment of the present invention comprise the firmware elements 1, 2, 16, 17, and 18 of the firmware diagram 200.

Figure 6:
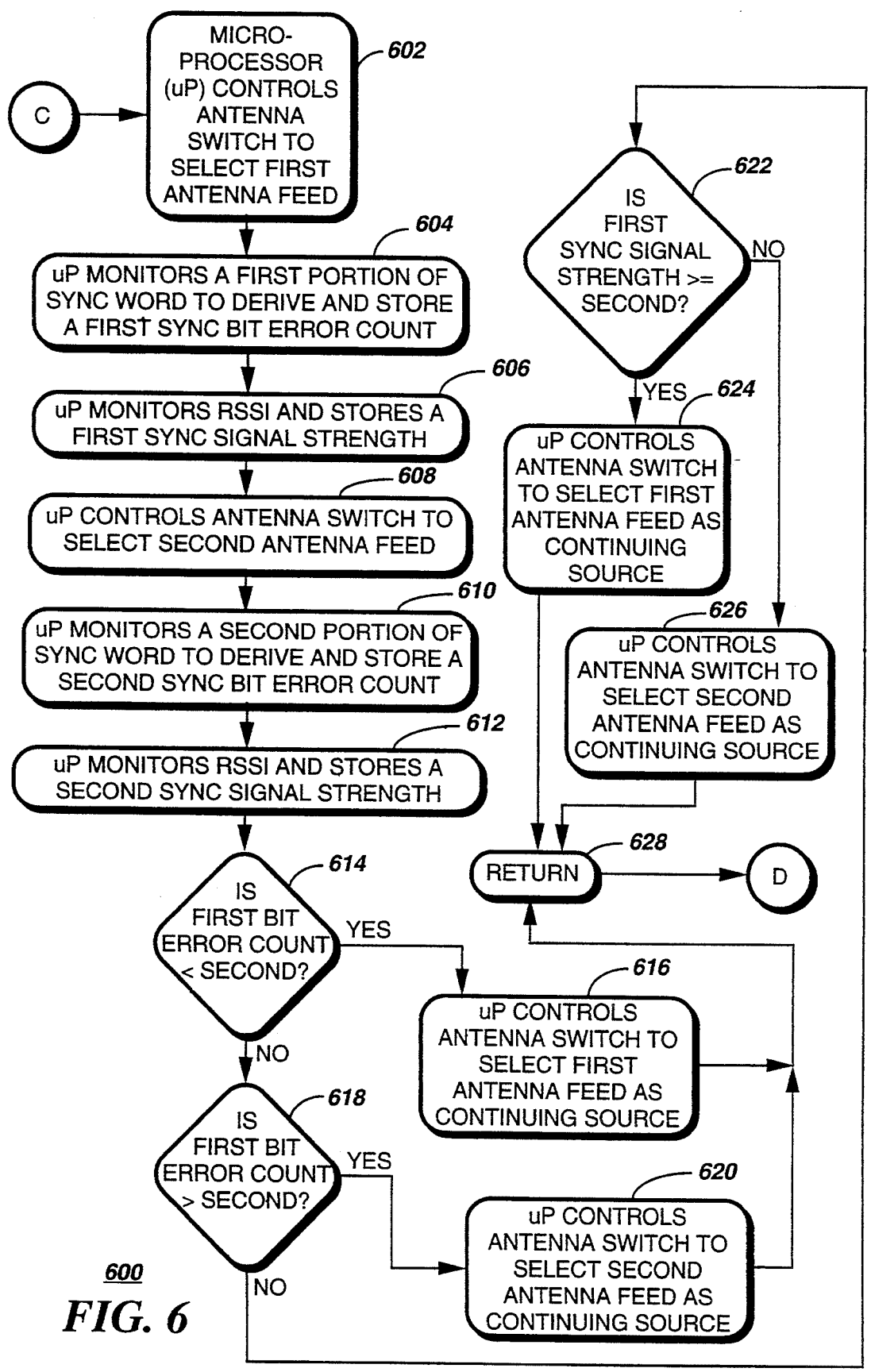
FIG. 6 is a flow chart of a sync word evaluation subroutine comprising the method of diversity reception in the data communication receiver in accordance with the preferred embodiment of the present invention.

Referring to FIG. 6, a flow chart of a sync word evaluation subroutine 600 comprising the method of diversity reception in the data communication receiver 100 in accordance with the preferred embodiment of the present invention begins with the microprocessor 114 controlling 602 the antenna switch 106 to select the first antenna feed 102. Next, the microprocessor 114 monitors 604 a first portion, e.g., the first 15 bits, of the sync word 304 to derive and store a first sync bit error count. Then the microprocessor 114 monitors 606 the RSSI element 115 and stores a first sync signal strength. Next, the microprocessor 114 controls 608 the antenna switch 106 to select the second antenna feed 104. Next, the microprocessor 114 monitors 610 a second portion, e.g., the second 15 bits, of the sync word 304 to derive and store a second sync bit error count. Then the microprocessor 114 monitors 612 the RSSI element 115 and stores a second sync signal strength.

In step 614 the microprocessor 114 checks whether the first sync bit error count is less than the second sync bit error count. If so, the microprocessor 114 controls 616 the antenna switch 106 to select the first antenna feed 102 as the continuing source of the radio signal, and then returns 628 to the main program 400 at step 412 (FIG. 4). If not, the microprocessor 114 checks 618 whether the first sync bit error count is greater than the second sync bit error count. If so, the microprocessor 114 controls 620 the antenna switch 106 to select the second antenna feed 104 as the continuing source of the radio signal, and then returns 628 to the main program 400 at step 412.

If, however, in step 618 the microprocessor 114 determines that the first sync bit error count is not greater than the second, i.e., they are equal to each other, then flow moves to step 622, where the microprocessor 114 checks to see if the first sync signal strength is greater than or equal to the second sync signal strength. If so, the microprocessor 114 controls 624 the antenna switch 106 to select the first antenna feed 102 as the continuing source of the radio signal, and then returns 628 to the main program 400 at step 412 (FIG. 4). If in step 622 the first sync signal strength is not greater than or equal to the second sync signal strength, the microprocessor 114 controls 626 the antenna switch 106 to select the second antenna feed 104 as the continuing source of the radio signal, and then returns 628 to the main program 400 at step 412. The firmware elements controlling the sync word evaluation subroutine 600 in accordance with the preferred embodiment of the present invention comprise the firmware elements 1, 2, 3, 10, 11, and 12 of the firmware diagram 200.

The sync word evaluation subroutine 600 in accordance with the preferred embodiment of the present invention advantageously provides a fast method, i.e., once every 0.2267 second for 2400 bps POCSAG signaling, of selecting between the first and second antenna feeds 102, 104 as the continuing source of the radio signal for the information batch 306. The selection is based upon received bit error counts for the sync word 304 received from the first and second antenna feeds 102, 104 during transmission of the sync word 304 immediately prior to the information batch 306 affected by the selection. The proximity of the sync word 304 to the affected information batch 306 ensures that the antenna feed 102, 104 selected for the information batch 306 may be reasonably predicted to have the lower error count of the two antenna feeds 102, 104 during transmission of the information batch 306.

Figure 7:
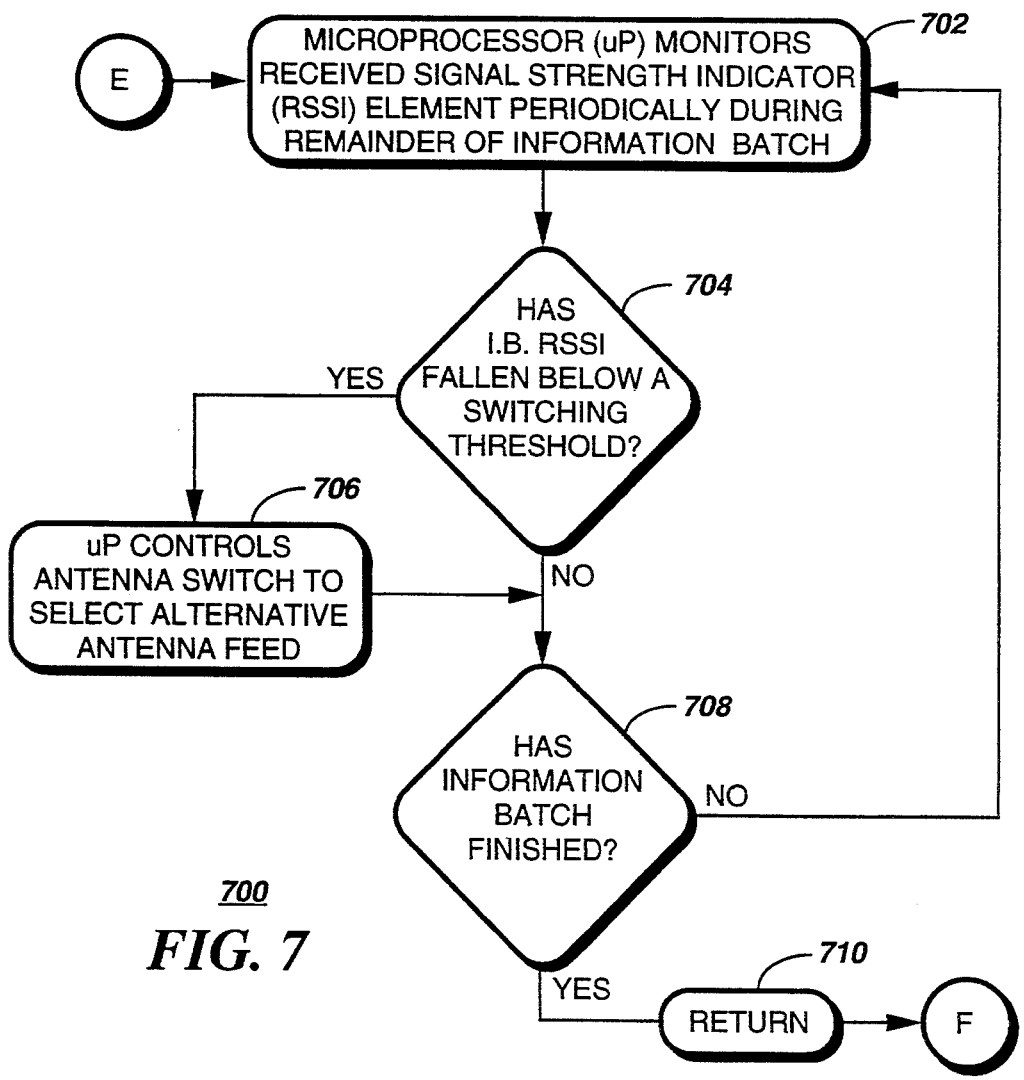
FIG. 7 is a flow chart of an information batch evaluation subroutine comprising the method of diversity reception in the data communication receiver in accordance with the preferred embodiment of the present invention.

Referring to FIG. 7, a flow chart of the information batch evaluation subroutine 700 comprising the method of diversity reception in the data communication receiver 100 in accordance with the preferred embodiment of the present invention begins with the microprocessor 114 monitoring 702 the RSSI element 115 periodically, e.g., once per code word, during the remainder of the information batch subsequent to the reception of the sync word 304. Concurrent with each monitoring interval, in step 704 the microprocessor 114 checks whether the information batch RSSI has fallen below a predetermined switching threshold. If so, the microprocessor 114 controls 624 the antenna switch 106 to select an alternative antenna feed as the continuing source of the radio signal, and then checks 708 whether the information batch has completed. If in step 704 the RSSI has not fallen below the predetermined switching threshold, the microprocessor 114 simply checks 708 whether the information batch has completed. If in step 708 the information batch has not finished, flow returns to step 702 to continue monitoring the RSSI. If, on the other hand, in step 708 the information batch has finished, then the microprocessor 114 returns to the main program 400 at step 416 (FIG. 4). The firmware elements controlling the preamble evaluation subroutine 700 in accordance with the preferred embodiment of the present invention comprise the firmware elements 1 and 4 of the firmware diagram 200.

Figure 8:
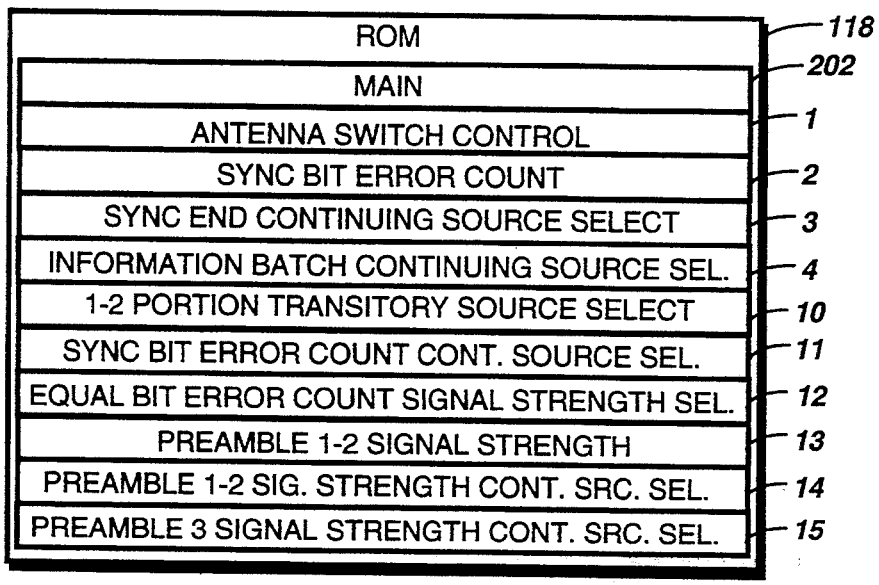
FIG. 8 is a firmware diagram for the read-only memory depicting firmware elements programmed therein for controlling the data communication receiver in accordance with a first alternative embodiment of the present invention.

Referring to FIG. 8, a firmware diagram 800 for the read-only memory 118 depicts firmware elements programmed therein for controlling the data communication receiver 100 in accordance with a first alternative embodiment of the present invention. The essential difference between the firmware diagram 800 and the firmware diagram 200 of the preferred embodiment of the present invention is that the firmware diagram 800 replaces the firmware elements 16, 17, and 18 of the firmware diagram 200 by three new firmware elements: a Preamble 1-2 Signal Strength element 13, a Preamble 1-2 Signal Strength Continuing Source Select element 14, and a Preamble 3 Signal Strength Continuing Source Select element 15. Operation of the first alternative embodiment that differs from the operation of the preferred embodiment is described below.

Figure 9:
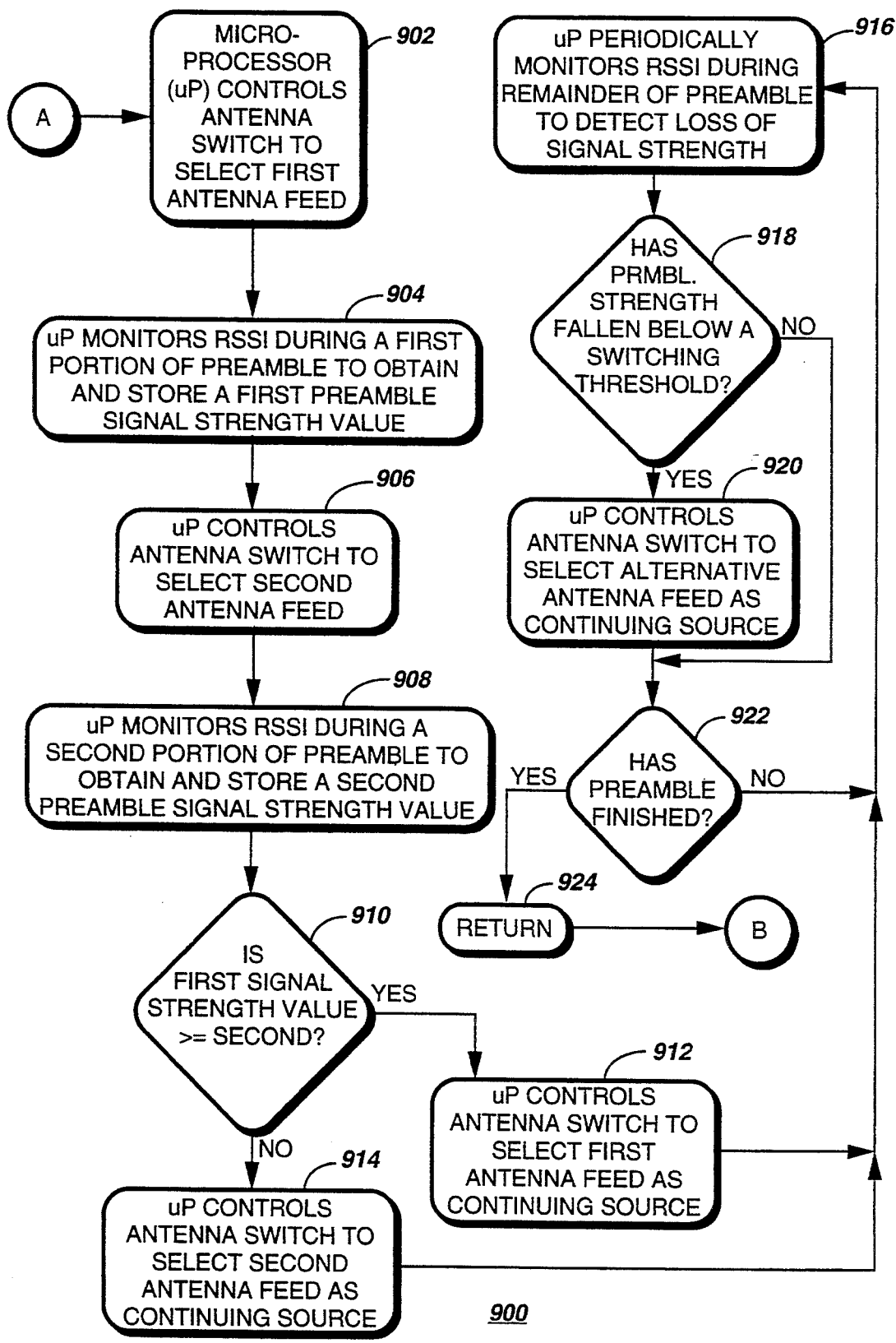
FIG. 9 is a flow chart of a preamble evaluation subroutine comprising the method of diversity reception in the data communication receiver in accordance with the first alternative embodiment of the present invention.

Referring to FIG. 9, a flow chart of a preamble evaluation subroutine 900 comprising the method of diversity reception in the data communication receiver 100 in accordance with the first alternative embodiment of the present invention begins with the microprocessor 114 controlling 902 the antenna switch 106 to select the first antenna feed 102. Next, the microprocessor 114 monitors 904 the RSSI element 115 during a first portion, e.g., 2 bits, of the preamble 302 to obtain and store in the RAM 120 a first preamble signal strength value. Then the microprocessor 114 controls 906 the antenna switch 106 to select the second antenna feed 104. Next, the microprocessor 114 monitors 908 the RSSI element 115 during a second portion, e.g., another 2 bits, of the preamble 302 to obtain and store in the RAM 120 a second preamble signal strength value. In step 910 the microprocessor 114 determines whether the first preamble signal strength value is greater than or equal to the second preamble signal strength value. If so, the microprocessor 114 controls 912 the antenna switch 106 to select the first antenna feed 102 as the continuing source for the radio signal and then moves to step 916. If in step 910 the first preamble signal strength value is not greater than or equal to the second preamble signal strength value, the microprocessor 114 controls 914 the antenna switch 106 to select the second antenna feed 104 as the continuing source for the radio signal and then moves to step 916.

In step 916 the microprocessor 114 continues to monitor the RSSI element 115 periodically, e.g., every 2 bits, during the remainder of the preamble 302 to detect a loss of signal strength. If in step 918 the microprocessor 114 detects that the preamble signal strength has fallen below a predetermined switching threshold, then the microprocessor 114 controls 920 the antenna switch 106 to select an alternative antenna feed, i.e., the antenna feed not currently selected, as the continuing source of the radio signal, then moves to step 922. If, on the other hand, in step 918 the microprocessor 114 does not detect that the preamble signal strength has fallen below a predetermined switching threshold, then the microprocessor 114 simply moves to step 922. In step 922 the microprocessor 114 determines whether the preamble 302 has finished. If not, flow returns to step 916 to continue monitoring preamble signal strength. If the preamble 302 has finished, then flow returns 924 to the main program 400 at step 406 (FIG. 4). The firmware elements controlling the preamble evaluation subroutine 900 in accordance with the first alternative embodiment of the present invention comprise the firmware elements 1, 13, 14, and 15 of the firmware diagram 800.

The preamble evaluation subroutine 900 in accordance with the first alternative embodiment of the present invention can provide a faster detection of a deteriorating signal than can the preamble evaluation subroutine 500 in accordance with the preferred embodiment of the present invention. This is because the preamble evaluation subroutine 900 is based on RSSI values, which typically can respond to signal strength changes more quickly than the time required to transmit a single bit. The preamble evaluation subroutine 500 is somewhat slower, because it must examine several, e.g., 30, bits before making a decision. On the other hand, the preamble evaluation subroutine 900 also can select the "wrong" antenna feed 102, 104 in the presence of an interfering signal being received with substantial signal strength on one of the antenna feeds 102, 104 but not the other, as was discussed above in the detailed description of the main program 400 (FIG. 4). For this reason, the preamble evaluation subroutine 500 is preferred unless a special application requires an unusually fast diversity response time during transmission of the preamble 302.

Figure 10:
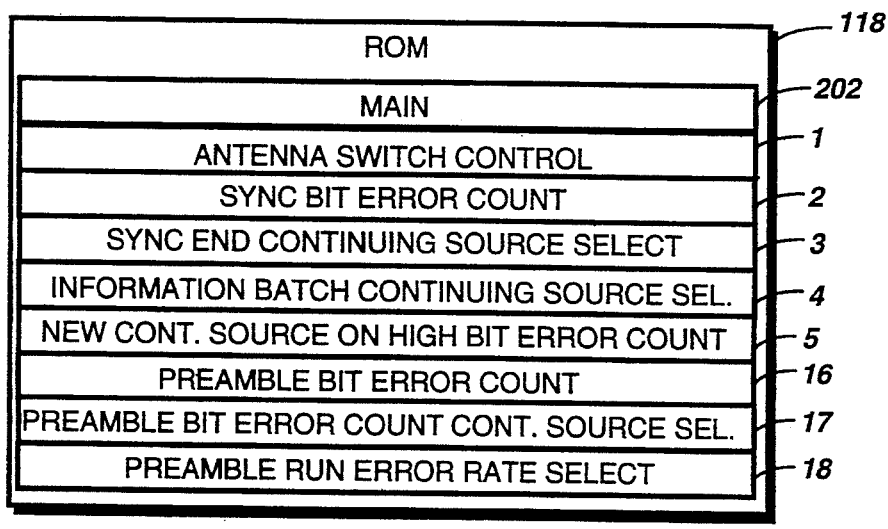
FIG. 10 is a firmware diagram for the read-only memory depicting firmware elements programmed therein for controlling the data communication receiver in accordance with a second alternative embodiment of the present invention.

Referring to FIG. 10, a firmware diagram 1000 for the read-only memory 118 depicts firmware elements programmed therein for controlling the data communication receiver 100 in accordance with a second alternative embodiment of the present invention. The essential difference between the firmware diagram 1000 and the firmware diagram 200 of the preferred embodiment of the present invention is that the firmware diagram 1000 replaces the firmware elements 10, 11 and 12 of the firmware diagram 200 by a New Continuing Source on High Bit Error Count element 5. Operation of the second alternative embodiment that differs from the operation of the preferred embodiment is described below.

Figure 11:
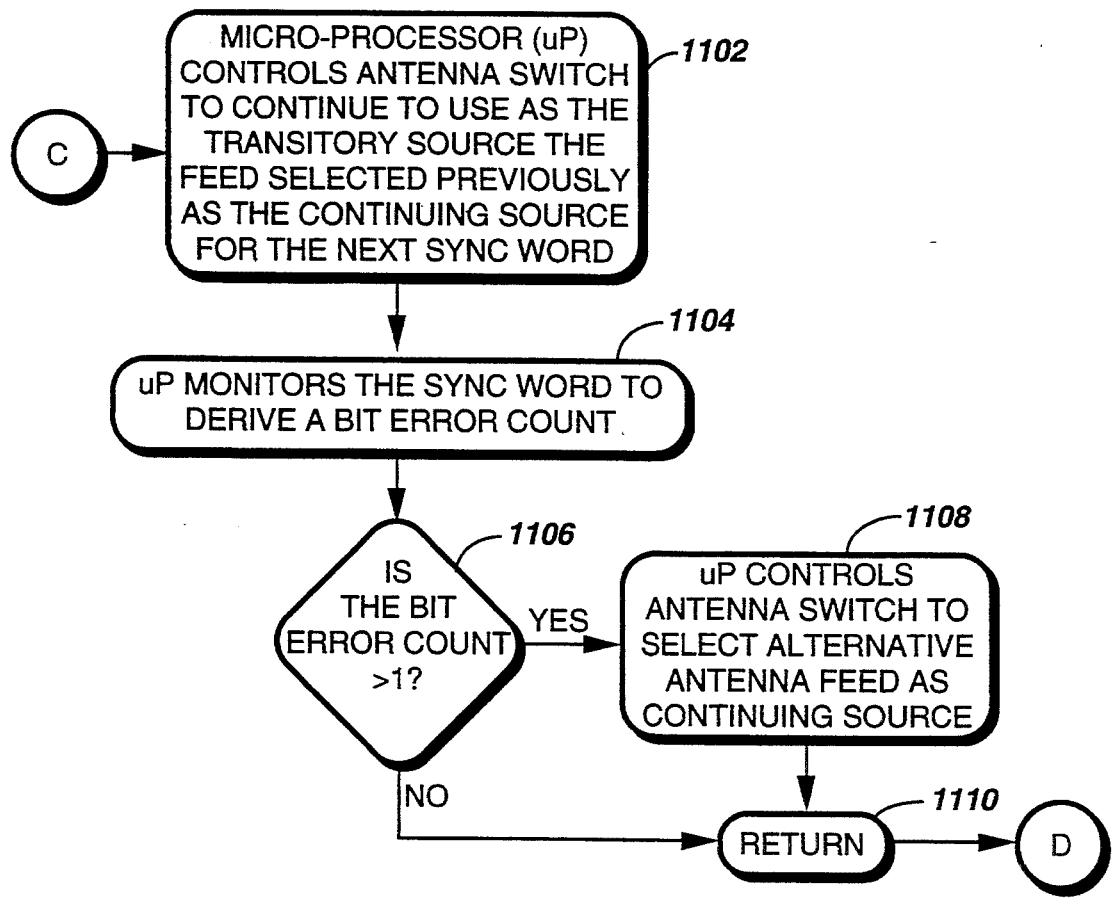
FIG. 11 is a flow chart of a sync word evaluation subroutine comprising the method of diversity reception in the data communication receiver in accordance with the second alternative embodiment of the present invention.

Referring to FIG. 11, a flow chart of a sync word evaluation subroutine 1100 comprising the method of diversity reception in the data communication receiver 100 in accordance with the second alternative embodiment of the present invention begins with the microprocessor 114 controlling 1102 the antenna switch 106 to continue to use a previously selected antenna feed as the transitory source of the radio signal for the next sync word 304. Then in step 1104 the microprocessor 114 monitors the sync word 304 to derive a bit error count. In step 1106 the microprocessor 114 determines whether the bit error count is greater than one. If so, the microprocessor 114 controls 1108 the antenna switch 106 to select an alternative antenna feed as the continuing source of the radio signal for the next information batch 306, and then returns 1110 to the main program 400 at step 412 (FIG. 4). If, on the other hand, in step 1106 the microprocessor 114 determines that the bit error count is not greater than one, then the microprocessor 114 simply returns 1110 to the main program 400 at step 412. The firmware elements controlling the sync word evaluation subroutine 1100 in accordance with the second alternative embodiment of the present invention comprise the firmware elements 1, 2, 3, and 5 of the firmware diagram 1000.

The sync word evaluation subroutine 1100 is considerably simpler than the sync word evaluation subroutine 600. The simplicity of the sync word evaluation subroutine 1100 could possibly result in a lower implementation cost. On the other hand, the sync word evaluation subroutine 1100 does not make an antenna feed selection until the occurrence of two bit errors in a sync word, and then it switches to the alternative antenna feed, which may or may not be a better source of the radio signal. For these reasons, the sync word evaluation subroutine 600 is preferred unless cost considerations force the use of the sync word evaluation subroutine 1100.

Figure 12:
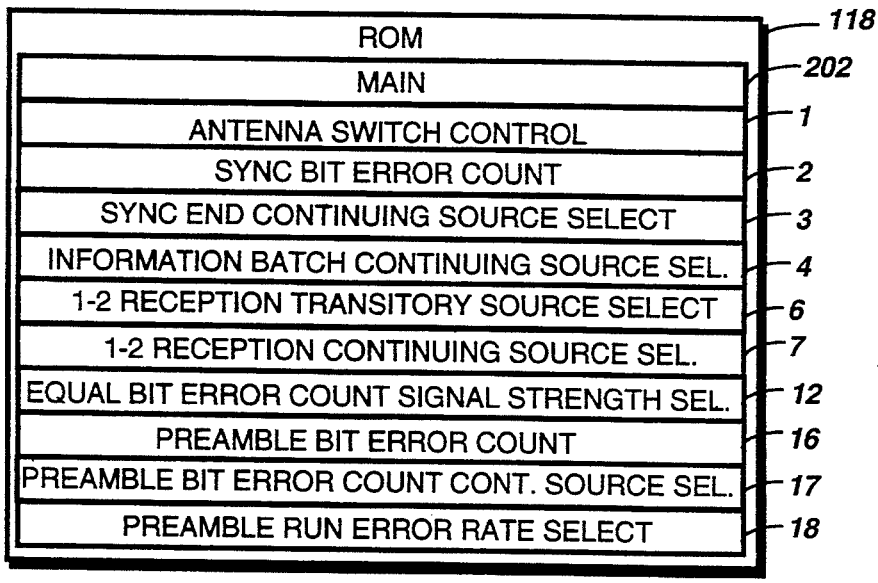
FIG. 12 is a firmware diagram for the read-only memory depicting firmware elements programmed therein for controlling the data communication receiver in accordance with a third alternative embodiment of the present invention.

Referring to FIG. 12, a firmware diagram 1200 for the read-only memory 116 depicts firmware elements programmed therein for controlling the data communication receiver 100 in accordance with a third alternative embodiment of the present invention. The essential difference between the firmware diagram 1200 and the firmware diagram 200 of the preferred embodiment of the present invention is that the firmware diagram 1200 replaces the firmware elements 10 and 11 of the firmware diagram 200 by a 1-2 Reception Transitory Source Select element 6 and a 1-2 Reception Continuing Source Select element 7. Operation of the third alternative embodiment that differs from the operation of the preferred embodiment is described below.

Figure 13:
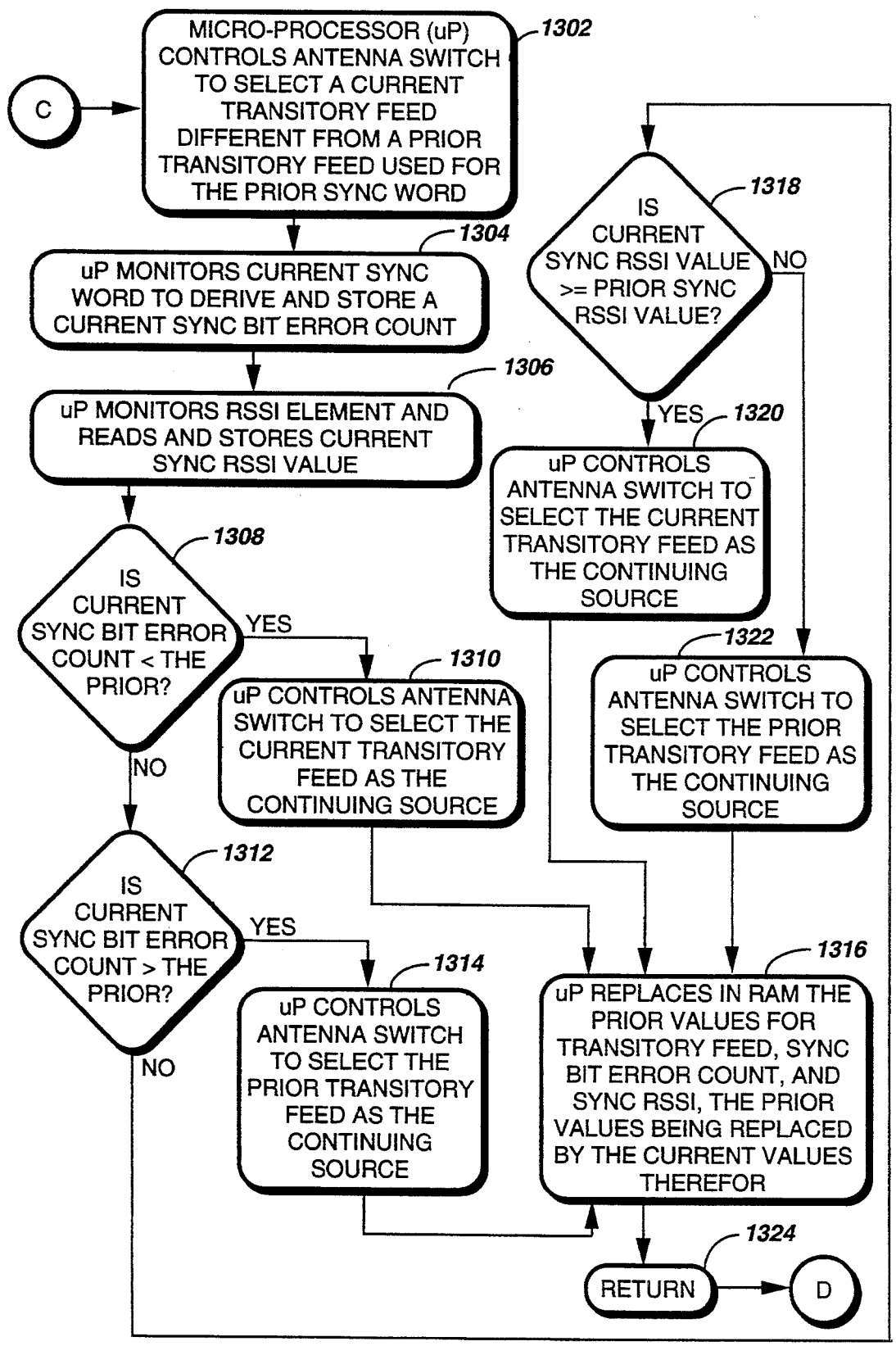
FIG. 13 is a flow chart of a sync word evaluation subroutine comprising the method of diversity reception in the data communication receiver in accordance with the third alternative embodiment of the present invention.

Referring to FIG. 13, a flow chart of a sync word evaluation subroutine 1300 comprising the method of diversity reception in the data communication receiver 100 in accordance with the third alternative embodiment of the present invention begins with the microprocessor 114 controlling 1302 the antenna switch 106 to select a current transitory feed different from a prior transitory feed selected for a prior sync word 304 received immediately before the current sync word 304. Next, the microprocessor 114 monitors 1304 most, e.g., thirty-one bits, of the current sync word 304 to derive and store in the RAM 120 a current sync bit error count. The microprocessor 114 also reads and stores 1306 a current RSSI value from the RSSI element 115. In step 1308 the microprocessor 114 checks to see if the current sync bit error count is less than a sync bit error count stored for the prior sync word 304. If so, the microprocessor 114 controls 1310 the antenna switch 106 to select the current transitory feed as the continuing source of the radio signal, and moves to step 1316.

If in step 1308 the current sync bit error count is not less than the prior sync bit error count stored for the prior sync word 304, then the microprocessor 114 checks in step 1312 whether the current sync bit error count is greater than the prior sync bit error count stored for the prior sync word 304. If so, the microprocessor 114 controls 1314 the antenna switch 106 to select the prior transitory feed as the continuing source of the radio signal, and moves to step 1316. If in step 1312 the current sync bit error count is not greater than the prior sync bit error count stored for the prior sync word 304, then the microprocessor 114 checks in step 1318 whether the current RSSI value is greater than or equal to a prior RSSI value stored for the prior sync word 304. If so, the microprocessor 114 controls 1320 the antenna switch 106 to select the current transitory feed as the continuing source of the radio signal, and moves to step 1316.

If in step 1318 the current RSSI value is not greater than or equal to the prior RSSI value, then the microprocessor 114 controls 1322 the antenna switch 106 to select the prior transitory feed as the continuing source of the radio signal, and moves to step 1316. In step 1316 the microprocessor 114 replaces in the RAM 120 the prior values for the transitory feed, the sync bit error count, and the RSSI, the prior values being replaced by the corresponding current values therefor. Flow then returns to the main program 400 (FIG. 4) at step 412. The firmware elements controlling the sync word evaluation subroutine 1300 in accordance with the third alternative embodiment of the present invention comprise the firmware elements 1, 2, 3, 6, 7, and 12 of the firmware diagram 1200.

The sync word evaluation subroutine 1300 in accordance with the third alternative embodiment of the present invention offers the advantage of determining and comparing bit error counts for substantially double the number of bits examined in the sync word evaluation subroutine 600, thus making the comparison somewhat more immune to incorrect antenna selection resulting from an isolated noise burst. Still, the sync word evaluation subroutine 1300 makes its selection based on errors counted over a longer time period and thus is perhaps less reliable than the sync word evaluation subroutine 600 as a predictor of better antenna feed in a changing multipath environment.

Figure 14:
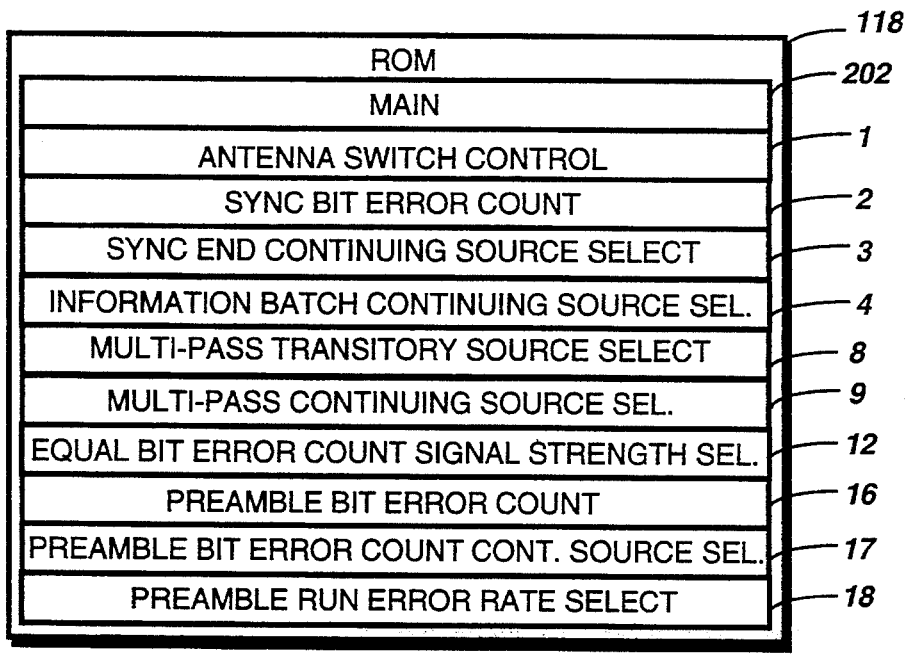
FIG. 14 is a firmware diagram for the read-only memory depicting firmware elements programmed therein for controlling the data communication receiver in accordance with a fourth alternative embodiment of the present invention.

Referring to FIG. 14, a firmware diagram 1400 for the read-only memory 118 depicts firmware elements programmed therein for controlling the data communication receiver 100 in accordance with a fourth alternative embodiment of the present invention. The essential difference between the firmware diagram 1400 and the firmware diagram 200 of the preferred embodiment of the present invention is that the firmware diagram 1400 replaces the firmware elements 10 and 11 of the firmware diagram 200 by a Multi-Pass Transitory Source Select element 8 and a Multi-Pass Continuing Source Select element 9. Operation of the fourth alternative embodiment that differs from the operation of the preferred embodiment is described below.

Figure 15:
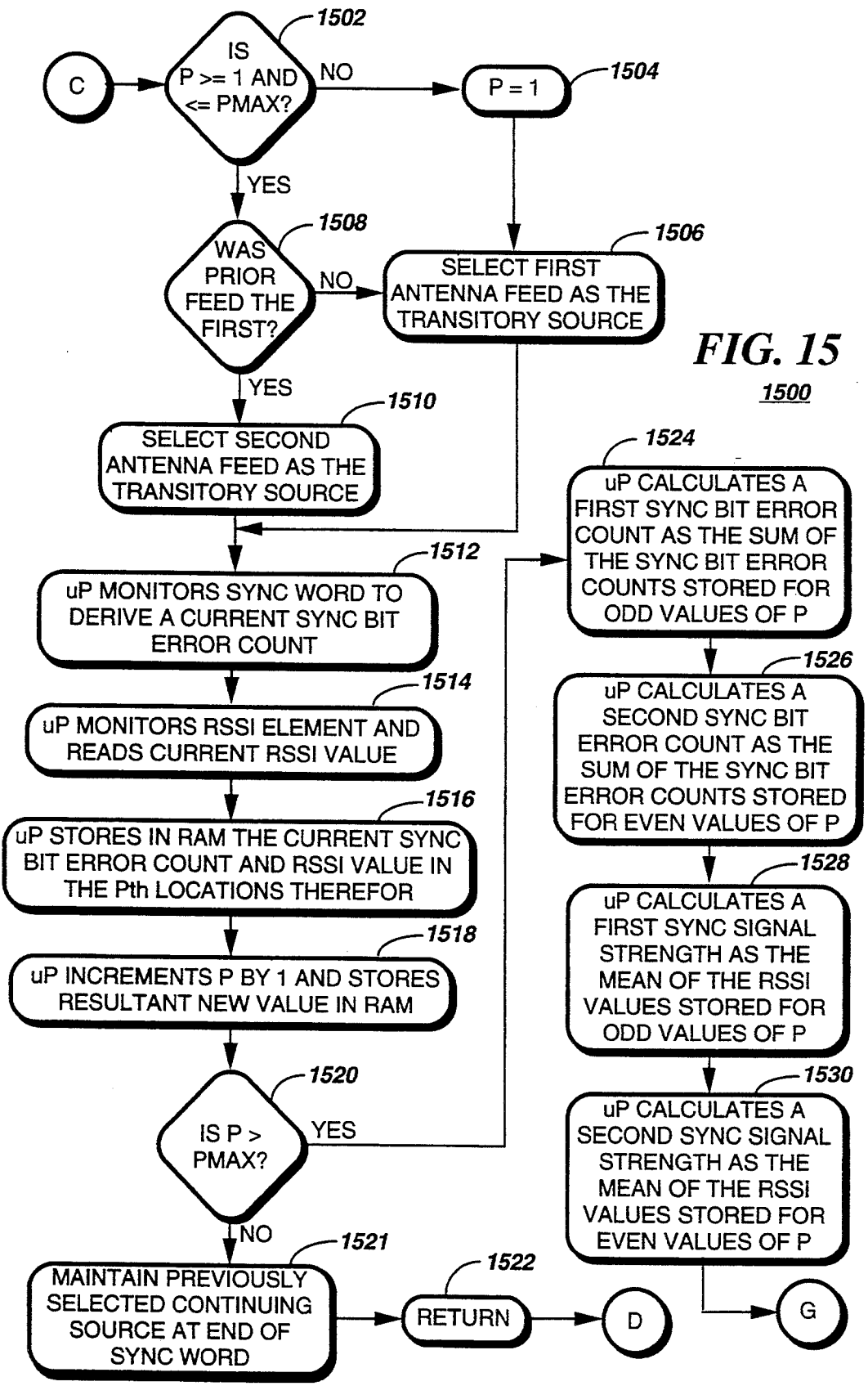
FIG. 15 is a flow chart of a sync word evaluation subroutine comprising the method of diversity reception in the data communication receiver in accordance with the fourth alternative embodiment of the present invention.

Referring to FIGS. 15 and 16, a flow chart of a sync word evaluation subroutine 1500 comprising the method of diversity reception in the data communication receiver 100 in accordance with the fourth alternative embodiment of the present invention begins with the microprocessor 114 checking 1502 whether a pass counter P is between one and a predetermined, even-valued pass count limit PMAX. If not, the microprocessor 114 sets 1504 P equal to one and controls 1506 the antenna switch 106 to select the first antenna feed 102 as the transitory source of the radio signal during transmission of the sync word 304, after which flow moves to step 1512.

If, on the other hand, in step 1502 the value of P is between one and PMAX, then the microprocessor 114 checks 1508 whether a prior antenna feed 102, 104 used during transmission of a prior sync word 304 immediately prior to the current sync word 304 was the first antenna feed 102. If not, the microprocessor 114 controls 1506 the antenna switch 106 to select the first antenna feed 102 as the transitory source, after which flow moves to step 1512. If in step 1508 the prior antenna feed 102, 104 was the first antenna feed 102, then the microprocessor 114 controls 1510 the antenna switch 106 to select the second antenna feed 104 as the transitory source, after which flow moves to step 1512. In step 1512 the microprocessor 114 monitors the sync word 304 to derive a current sync bit error count for the current sync word 304. Then the microprocessor 114 monitors 1514 the RSSI element 115 and reads a current RSSI value. Next, the microprocessor 114 stores 1516 the current sync bit error count and the current RSSI value in locations designated for the sync bit error count and the current RSSI value corresponding to the Pth pass in the RAM 120. Then the microprocessor 114 increments 1518 the value of P by unity, and stores the resultant new value in the RAM 120. Next, the microprocessor 114 checks 1520 to see if P now exceeds PMAX. If not, the microprocessor 114 maintains 1521 use of a previously selected continuing source as the antenna feed 102, 104 for the information batch 306 after completion of the current sync word 304, and then flow returns 1522 to the main program 400 (FIG. 4) at step 412.

If, instead, in step 1520 the microprocessor 114 determines that P now exceeds PMAX, then the microprocessor 114 calculates 1524 a first sync bit error count as the sum of the sync bit error counts stored in locations designated for the sync bit error count corresponding to odd values of P in the RAM 120. Next, the microprocessor 114 calculates 1526 a second sync bit error count as the sum of the sync bit error counts stored in locations designated for the sync bit error count corresponding to even values of P in the RAM 120. Then the microprocessor 114 calculates 1528 a first sync signal strength as the mean of the RSSI values stored in locations designated for the RSSI values corresponding to odd values of P in the RAM 120. Next, the microprocessor 114 calculates 1530 a second sync signal strength as the mean of the RSSI values stored in locations designated for the RSSI values corresponding to even values of P in the RAM 120. Then flow moves to step 1614 (FIG. 16).

In step 1614 the microprocessor 114 checks to see if the first sync bit error count is less than the second sync bit error count. If so, the microprocessor 114 controls 1616 the antenna switch 106 to select the first antenna feed 102 as the continuing source of the radio signal, and then returns 1628 to the main program 400 at step 412 (FIG. 4). If in step 1614 the first sync bit error count is not less than the second sync bit error count, the microprocessor 114 checks 1618 whether the first sync bit error count is greater than the second sync bit error count. If so, the microprocessor 114 controls 1620 the antenna switch 106 to select the second antenna feed 104 as the continuing source of the radio signal, and then returns 1628 to the main program 400 at step 412.

If, however, in step 1618 the microprocessor 114 determines that the first sync bit error count is not greater than the second, i.e., they are equal to each other, then flow moves to step 1622, where the microprocessor 114 checks to see if the first sync signal strength is greater than or equal to the second sync signal strength. If so, the microprocessor 114 controls 1624 the antenna switch 106 to select the first antenna feed 102 as the continuing source of the radio signal, and then returns 1628 to the main program 400 at step 412 (FIG. 4). If in step 1622 the first sync signal strength is not greater than or equal to the second sync signal strength, then the microprocessor 114 controls 1626 the antenna switch 106 to select the second antenna feed 104 as the continuing source of the radio signal, and then returns 1628 to the main program 400 at step 412. The firmware elements controlling the sync word evaluation subroutine 1500 in accordance with the fourth alternative embodiment of the present invention comprise the firmware elements 1, 2, 3, 8, 9, and 12 of the firmware diagram 1400.

Like the sync word evaluation subroutine 1300 in accordance with the third alternative embodiment of the present invention, the sync word evaluation subroutine 1500 in accordance with the fourth alternative embodiment of the present invention offers the advantage of determining and comparing bit error counts for substantially more bits than examined in the sync word evaluation subroutine 600, thus making the comparison substantially more immune to incorrect antenna selection resulting from an isolated noise burst. Still, the sync word evaluation subroutine 1500 makes its selection based on bit errors counted over a substantially longer (and pre-programmable) time period and thus is perhaps less reliable than the sync word evaluation subroutine 600 as a predictor of best antenna feed in a rapidly changing multipath environment. An example of an application in which the sync word evaluation subroutine 1500 may perform very well is a satellite transmission application having a slowly varying multipath environment, e.g., several seconds between changes in the best antenna feed. The sync word evaluation subroutine 1500 would be an even better choice for such an application if short, e.g., one millisecond or less, noise bursts were a common source of interference in the application. The effect of such noise bursts would be averaged over the substantially longer time period for counting bit errors, thereby leading to selection of an antenna feed having a better long-term performance.

Thus, the present invention comprises a method and apparatus for building a diversity receiver that provides the cost and power advantages of a single receiver, switched antenna approach, but that can continuously select an antenna feed having a stronger signal. The present invention also provides a flexibility in the way in which a decision is made concerning antenna feed selection. Consequently, the present invention allows custom tailoring of a diversity receiver to optimize the antenna feed selection for a specific multipath environment.

We claim:

1. A method of diversity reception of a radio signal in a data communication receiver comprising first and second antenna feeds having substantially de-correlated sensitivities to the radio signal, the radio signal comprising data including at least one information batch having a predetermined batch duration and prefixed by a predetermined bit pattern, the method comprising the steps of:
   (a) selecting between the first antenna feed and the second antenna feed as a transitory source of the radio signal during transmission of the predetermined bit pattern;
   (b) monitoring the radio signal received from the transitory source selected in step (a) during the transmission of the predetermined bit pattern to derive the data therefrom;
   (c) determining at least one bit error count for the data derived in step (b);
   (d) selecting between the first and second antenna feeds to be a continuing source of the radio signal at a completion of the predetermined bit pattern in response to the at least one bit error count determined in step (c);
   (e) measuring a first signal strength of the radio signal from the first antenna feed during transmission of a first portion of the predetermined bit pattern;
   (f) measuring a second signal strength of the radio signal from the second antenna feed during transmission of a second portion of the predetermined bit pattern;
   (g) determining that a signal strength conflict exists in response to the first signal strength being greater than the second signal strength, the second antenna feed having been selected in step (d) as the continuing source, and also in response to the second signal strength being greater than the first signal strength, the first antenna feed having been selected in step (d) as the continuing source;
   (h) determining that no signal strength conflict exists in response to the first signal strength being greater than the second signal strength, the first antenna feed having been selected in step (d) as the continuing source, and also in response to the second signal strength being greater than the first signal strength, the second antenna feed having been selected in step (d) as the continuing source;
   (i) maintaining the selection of the continuing source selected in step (d) throughout the predetermined batch duration, it having been determined in step (g) that a signal strength conflict exists; and
   (j) periodically re-selecting the continuing source throughout the predetermined batch duration in response to signal strength measurements determined for the first and second antenna feeds, it having been determined in step (h) that no signal strength conflict exists.

2. The method in accordance with claim 1, wherein step (a) comprises the steps of:
   (k) selecting the first antenna feed as the transitory source during transmission of a first portion of the predetermined bit pattern; and
   (l) selecting the second antenna feed as the transitory source during transmission of a second portion of the predetermined bit pattern, and wherein step (c) comprises the steps of:
   (m) determining a first bit error count for the data derived in step (b) during the transmission of the first portion of the predetermined bit pattern from the first antenna feed selected in step (k); and (n) determining a second bit error count for the data derived in step (b) during the transmission of the second portion of the predetermined bit pattern from the second antenna feed selected in step (l), and wherein step (d) comprises the steps of:

(o) selecting the continuing source to be the first antenna feed when the first bit error count is less than the second bit error count; and (p) selecting the continuing source to be the second antenna feed when the first bit error count is greater than the second bit error count, and wherein the method further comprises the steps of:

(q) measuring a first signal strength of the radio signal from the first antenna feed during step (k) and a second signal strength of the radio signal from the second antenna feed during step (l);

(r) selecting the continuing source to be the first antenna feed, the first and second bit error counts being equal to one another, and the first signal strength being greater than or equal to the second signal strength; and (s) selecting the continuing source to be the second antenna feed, the first and second bit error counts being equal to one another, and the first signal strength being less than the second signal strength.

3. The method in accordance with claim 1, wherein the data further includes a preamble, and wherein the method further comprises during initial acquisition of the radio signal the steps of:

(k) measuring a first signal strength of the radio signal from the first antenna feed during transmission of a first portion of the preamble;

(l) measuring a second signal strength of the radio signal from the second antenna feed during transmission of a second portion of the preamble;

(m) selecting the first antenna feed as the continuing source in response to the first signal strength being greater than or equal to the second signal strength; and (n) selecting the second antenna feed as the continuing source in response to the first signal strength being less than the second signal strength.

4. The method in accordance with claim 3, further comprising the steps of:

(o) monitoring signal strength of the radio signal throughout a third portion of the preamble;

(p) selecting the second antenna feed as the continuing source in response to the signal strength monitored in step (o) falling below a predetermined threshold when the first antenna feed is currently selected as the continuing source; and (q) selecting the first antenna feed as the continuing source in response to the signal strength monitored in step (o) falling below the predetermined threshold when the second antenna feed is currently selected as the continuing source.

5. A method of diversity reception in a data communication receiver comprising first and second antenna feeds having substantially de-correlated sensitivities to a radio signal, the radio signal comprising data including at least one information batch having a predetermined batch duration and prefixed by a predetermined bit pattern, the method comprising the steps of:

(a) selecting the first antenna feed as a transitory source of the radio signal during transmission of a first portion of the predetermined bit pattern;

(b) selecting the second antenna feed as the transitory source of the radio signal during transmission of a second portion of the predetermined bit pattern;

(c) monitoring the radio signal received from the transitory source selected in steps (a) and (b) during the transmission of the predetermined bit pattern to derive the data therefrom;

(d) determining a first bit error count for the data derived in step (c) during the transmission of the first portion of the predetermined bit pattern from the first antenna feed selected in step (a);

(e) determining a second bit error count for the data derived in step (c) during the transmission of the second portion of the predetermined bit pattern from the second antenna feed selected in step (b);

(f) selecting a continuing source of the radio signal at a completion of the predetermined bit pattern to be the first antenna feed in response to the first bit error count being less than the second bit error count;

(g) selecting the continuing source to be the second antenna feed, the first bit error count being greater than the second bit error count;

(h) measuring signal strength of the radio signal throughout the predetermined batch duration;

(i) selecting the second antenna feed as the continuing source in response to the signal strength measured in step (h) falling below a predetermined threshold when the first antenna feed is currently selected as the continuing source; and (j) selecting the first antenna feed as the continuing source in response to the signal strength measured in step (h) falling below the predetermined threshold when the second antenna feed is currently selected as the continuing source.

6. A data communication receiver for providing diversity reception of a radio signal comprising data including at least one information batch having a predetermined batch duration and prefixed by a predetermined bit pattern, the data communication receiver comprising:

first and second antenna feeds having substantially de-correlated sensitivity to a radio signal;

an antenna switch coupled to the first and second antenna feeds for selecting between the first antenna feed and the second antenna feed as a source of the radio signal;

a receiver coupled to the antenna switch for receiving the radio signal from the antenna switch and for demodulating the radio signal to derive the data;

a processor coupled to the receiver and to the antenna switch for controlling the antenna switch in response to quality measurements made on the received radio signal;

an antenna switch control element coupled to the antenna switch for controlling the antenna switch to select between the first and the second antenna feed as a transitory source of the radio signal during transmission of the predetermined bit pattern;

a sync bit error count element coupled to the antenna switch control element for determining at least one bit error count in the data received during the transmission of the predetermined bit pattern;

a sync end continuing source select element coupled to the sync bit error count element for controlling the antenna switch to select the first or the second antenna feed as a continuing source of the radio signal at a completion of the predetermined bit pattern in response to the at least one bit error count;

a 1-2 portion transitory source select element coupled to the antenna switch control element for selecting the first antenna feed as the transitory source during transmission of a first portion of the predetermined bit pattern to determine a first bit error count, and for selecting the second antenna feed as the transitory source during transmission of a second portion of the predetermined bit pattern to determine a second bit error count;

a sync bit error count continuing source select element coupled to the 1-2 portion transitory source select element for selecting the continuing source to be the first antenna feed in response to the first bit error count being less than the second bit error count, and for selecting the continuing source to be the second antenna feed in response to the first bit error count being greater than the second bit error count;

a received signal strength indicator element coupled to the receiver and to the processor for measuring the signal strength of the radio signal in response to the first and second bit error counts being equal to one another; and an equal bit error count signal strength select element coupled to the received signal strength indicator element for selecting the continuing source to be the first antenna feed in response to the first signal strength being measured greater than or equal to the second signal strength, and for selecting the continuing source to be the second antenna feed in response to the first signal strength being measured less than the second signal strength.

7. The data communication receiver of claim 6, wherein the data further includes a preamble, and wherein the data communication receiver further comprises:

a received signal strength indicator element coupled to the receiver and to the processor for indicating the signal strength of the radio signal;

a preamble 1-2 signal strength element coupled to the received signal strength indicator element for storing a first signal strength of the radio signal from the first antenna feed during transmission of a first portion of a preamble received at initial acquisition of the radio signal, and for receiving and storing a second signal strength of the radio signal from the second antenna feed during transmission of a second portion of the preamble; and a preamble 1-2 signal strength continuing source select element coupled to the preamble 1-2 signal strength element for selecting as the continuing source the first antenna feed in response to the first signal strength being equal to or greater than the second signal strength, and for selecting as the continuing source the second antenna feed in response to the first signal strength being less than the second signal strength.

8. The data communication receiver of claim 6, wherein the data further includes a preamble, and wherein the data communication receiver further comprises:

a preamble bit error count element coupled to the receiver and controlling the antenna switch for monitoring the radio signal received from the first antenna feed during transmission of a first portion of a preamble to derive a first bit error count therefrom, and for monitoring the radio signal received from the second antenna feed during transmission of a second portion of the preamble to derive a second bit error count therefrom;

a preamble bit error count continuing source select element coupled to the preamble bit error count element for selecting the first antenna feed as the continuing source in response to the first bit error count being less than or equal to the second bit error count, and for selecting the second antenna feed as the continuing source in response to the first bit error count being greater than the second bit error count; and a preamble run error rate select element coupled to the receiver for monitoring the radio signal received during transmission of a third portion of the preamble to derive a running bit error rate therefrom, and for selecting an antenna feed different from a currently selected continuing source as a new continuing source in response to the running bit error rate being higher than a predetermined limit.

* * * * *